MEMORY CONTROL MATRIX

Filed June 30, 1965 3 Sheets-Sheet 1

FIG. I

INVENTORS
L. J. BOLAND
C. ZEITLER, JR.
BY Sughrue, Rothwell, Mion, Zinn & Macpeak
ATTORNEYS

MEMORY CONTROL MATRIX

Filed June 30, 1965

3,354,430
MEMORY CONTROL MATRIX

Carl Zeitler, Jr., and Lawrence J. Boland, Poughkeepsie, N.Y., assignors to International Business Machines Corporation, Armonk, N.Y., a corporation of New York
Filed June 30, 1965, Ser. No. 468,421
6 Claims. (Cl. 340—172.5)

This invention relates generally to data processing systems and more particularly to a memory control matrix which reduces the average access-time of a memory by permitting the original destination of a data fetch from the memory to be changed or cancelled during a memory cycle.

In the past, it was necessary to complete a memory cycle for an instruction word fetch for an instruction unit, for example, even though a subsequent sensed external condition, such as a branch or transfer, rendered the instruction word unnecessary. Furthermore, after the initiation of a memory fetch cycle for a data word for use in a particular receiving register, another more desirable register might become available before the data word was accessible at the memory output for transfer to the original register; however, the data could not be reassigned to the second register until the original memory fetch cycle had terminated.

In a high speed data processing system, the memory fetch cycle may consume as many as five operating cycles of the central processor controlling the data flow between memories and receiving registers, and a lot of time was wasted by causing the CPU completely to cycle through an unnecessary memory fetch cycle.

Therefore, the principal object of this invention is to reduce the average memory cycle or access-time in a data processing system controlled by a high speed central processor.

Another object is to provide a memory control matrix which permits the original destination of information selected or addressed in a memory to be changed or cancelled after selection but prior to its becoming accessible for transfer to a destination.

Another object is to provide means synchronized with a central processor for keeping track of a memory data-fetch cycle at the beginning of which stored data is selected or addressed for a programmed transfer at memory access-time to a first destination, and for changing prior to access-time the destination to which the data is actually transferred at access-time.

Another object is to provide a memory control matrix for keeping track of the status of a plurality of interleaved memories and receiving registers in a data processing system by indicating each memory which has been selected for a data fetch and to which register the data from each memory is to be transferred at memory access-time.

A specific object of this invention is to provide a memory control matrix for a data processing system including a plurality of memories connected via a common bus to a plurality of data receiving registers, the matrix controlling the transfer of data between the memories and the bus and between the bus and the receiving registers, and including a shift register for each memory and for each receiving register to indicate during each cycle of the central processor the status of each memory and receiving register.

A more specific object of this invention is to provide such a memory control matrix in which the control of the common bus may be changed, without interrupting the memory fetch cycle, from the shift register associated with a first assigned receiving register to another shift register associated with a second receiving register so that data is transferred at memory access-time to the second receiving register rather than to the first receiving register.

The foregoing and other objects, features and advantages of the invention will be apparent from the following more particular description of a preferred embodiment of the invention as illustrated in the accompanying drawings in which.

Figure 1:
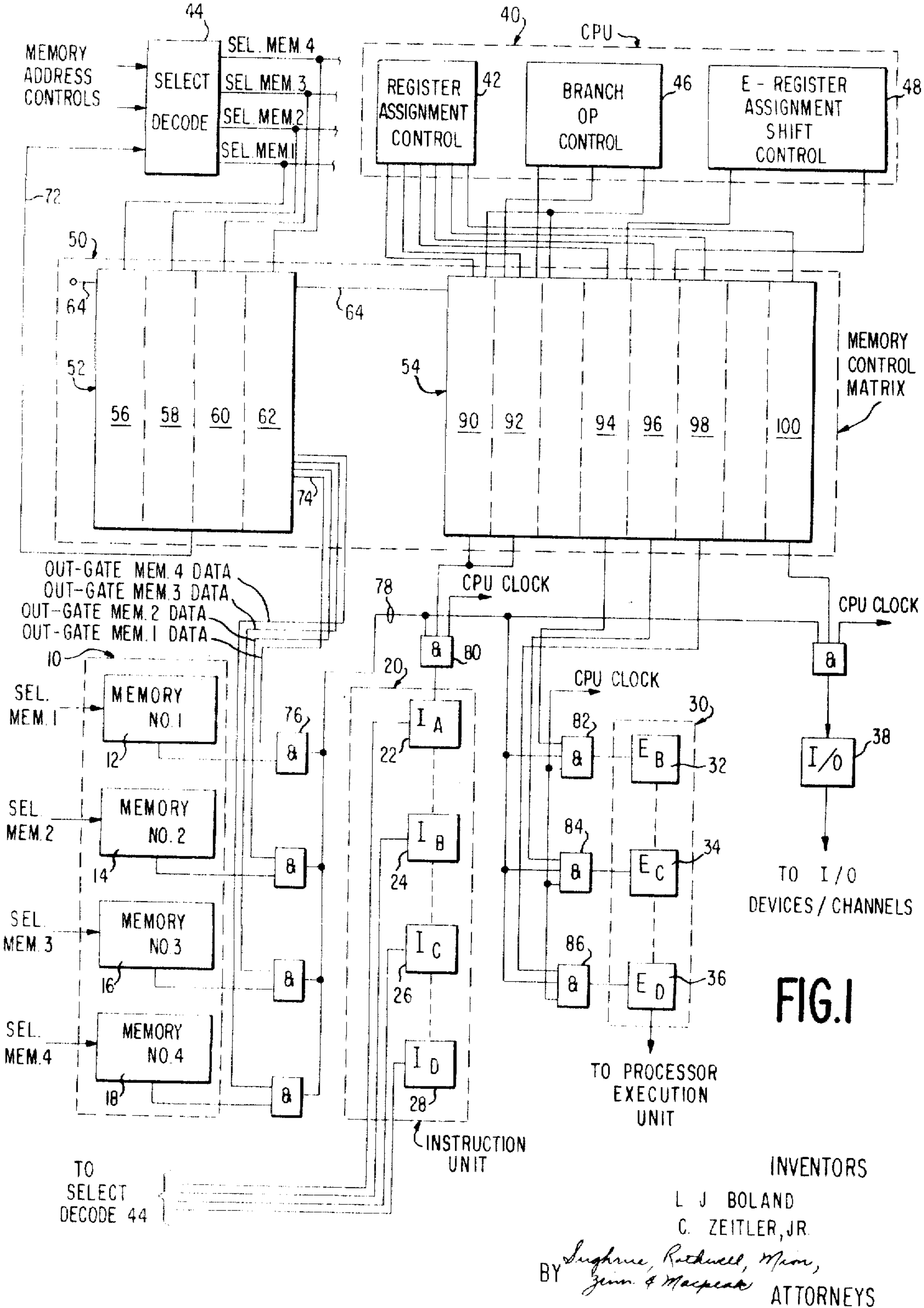
FIGURE 1 shows a preferred embodiment of the memory control matrix as applied to a data processing system including a plurality of interleaved memories and a plurality of receiving registers operating under the control of a high speed central processing unit (CPU)

For the purpose of describing in detail a preferred embodiment of this invention, there is shown in FIGURE 1 a data processing system including a bank 10 of four interleaved or sequentially addressed memory units 12, 14, 16, and 18 each of which contains data and instruction words in the form of bits stored at addressable locations therein. Other parts of the data processing system are an instruction unit 20 containing four instruction registers 22, 24, 26, and 28 for receiving instruction words transferred from the memories 10. In addition, there is a stack 30 of data registers 32, 34, and 36 for receiving data words received from the memory before being sent to the execution unit (not shown) of the processing system. The instruction registers are also labeled $I_A$, $I_B$, $I_C$, and $I_D$, and the data registers are also labeled as $E_B$, $E_C$, and $E_D$. In a typical data fetch instruction, for example, the data is sent to the E-register corresponding to the instruction register in which the instruction word is stored at the time of the transfer. There is also provided an input-output (I/O) register 38 for receiving data for use by the various I/O devices (not shown) of the data processing system.

The transfer of words from the four memory units to the various receiving registers is under the control of a central processing unit (CPU) 40. The REGISTER ASSIGNMENT CONTROL 42 of the CPU determines the receiving register which is to receive the data or instruction word from memory bank 10. In one particular data processing system in which this invention may be used, a fetch cycle of each of the memories 10 requires five operating cycles of the CPU 40. For example, during the first CPU cycle of a data fetch, the memory address code from instruction unit 20 is fed to a decoder 44 which produces a signal "SEL MEM-" on one of its four output lines depending upon which memory in bank 10 is to be selected or addressed. At the end of CPU cycle-time 5 or ACCESS time, the data word is available or accessible at the output of the selected memory for transfer to the E-register in stack 30 specified by REGISTER ASSIGNMENT CONTROL 42.

CPU 42 also contains a branch operation control (BRANCH OP CONTROL) 46 and an E-REGISTER SHIFT CONTROL 48. The function of these controls will be presented below.

This invention is directed specifically to a MEMORY CONTROL MATRIX 50 which keeps track of the selected memories 10 and the assignments of memory fetches to registers 20, 30, and 38. The control matrix 50 not only determines which memory or memories in the bank 10 have been selected but also tracks each memory cycle to indicate how long each selected memory will be busy. In addition, matrix 50 indicates the assignment or commitment of the various receiving registers in Instruction Unit 20, E-stack 30 and I/O Register 38.

Furthermore, control matrix 50 permits a change in the assignment of the registers during a memory cycle which is initiated at MEMORY SELECT time and terminates one cycle after ACCESS time. This memory cycle comprises six CPU operating cycles. For example, in I-Unit 20, instruction words always enter through the instruction register 22 and then are desirably shifted down through registers 24, 26, and 28. If a later instruction or external condition indicates that an earlier instruction stored in one of the lower instruction registers need not be executed, then the CPU resets a portion of control matrix 50 to block the transfer of the unnecessary data word to E-stack 30. Furthermore, if a particular one of the data E-registers 30 is unavailable at memory SELECT time, but becomes available before ACCESS time, matrix 50 responds to a suitable CPU signal to permit a change in assignment to the later available register during the memory cycle without requiring the CPU to wait for the end of the memory cycle to shift data down in E-stack 30. Such a situation will arise when an instruction resides in register $I_B$ at SELECT time and is shifted down I-stack 20 during the memory cycle. The matrix functions to assign the data-fetch to the E-register corresponding to the I-register holding its instruction at ACCESS time. Consequently, the memory control matrix reduces the average memory ACCESS time of the data processing system.

Figure 2:
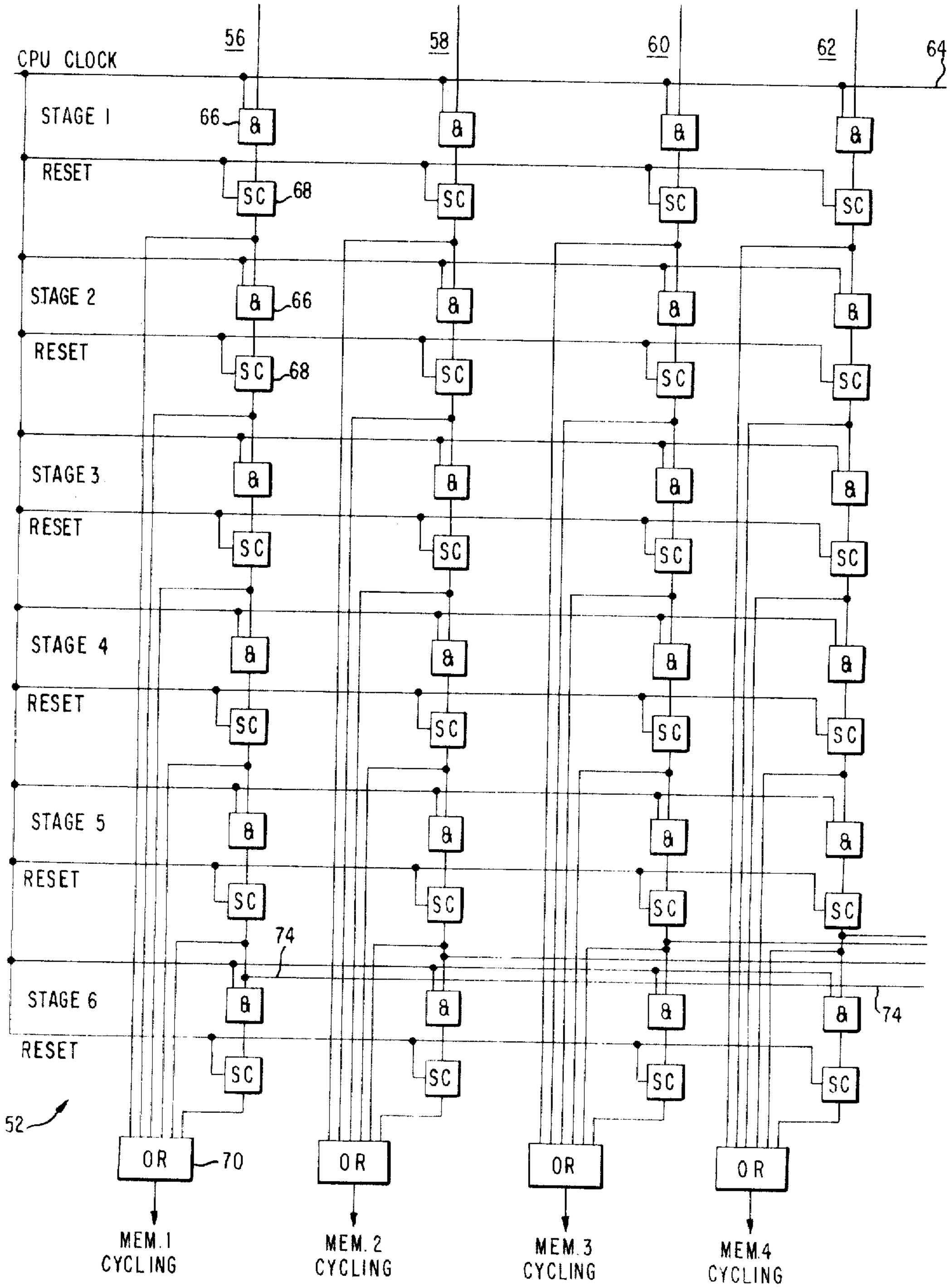
FIGURE 2 shows the details of the section of the matrix which controls the access of the memories to a common data bus.
Figure 3:
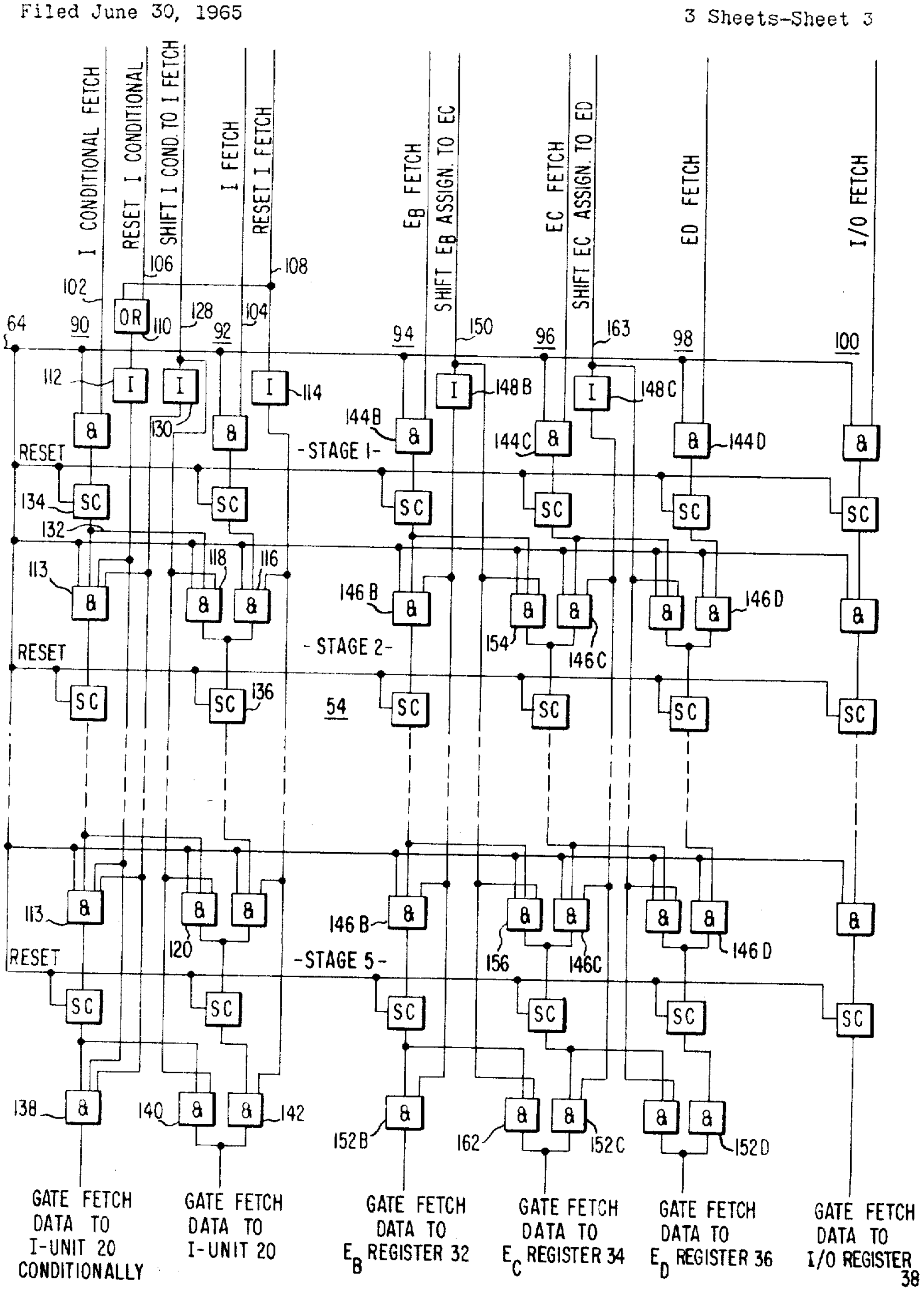
FIGURE 3 shows the details of the section of the matrix which controls the access of the various receiving registers to the common data bus.

Let us now look at Memory Control Matrix 50 in more detail. As shown in FIGURE 1, it contains two main sections: a memory-select section 52 and a register-assignment section 54. Each section in essence contains a plurality of shift registers corresponding to the number of memories or registers controlled by the section. The details of the memory-select sections are shown in FIGURE 2, and the details of the register-assignment section are shown in FIGURE 3. In FIGURE 2 for example, since the data processing system of FIGURE 1 contains four memory units in bank 10, memory-select section 52 of control matrix 50 contains four shift registers 56, 58, 60, and 62, each of which is driven by the clock pulse generator (not shown) of the CPU and has six stages, each stage comprising an AND gate and a shift cell (SC). The shift cell forms no part of this invention and comprises two latches interconnected to function so that the shift cell is automatically reset by each CPU clock pulse, unless a bit pulse appears at the cell's input to override the reset pulse and thereby set the cell.

The shift registers shown in FIGURE 2 are identical in operation, so let us look at shift register 56 and assume that I-Unit 20 has selected an address in memory No. 1 in bank 10 for a data fetch to one of the E-registers 30. Consequently, at CPU cycle-1, the SEL MEM 1 line of Decoder 44 will be energized for the length of the CPU cycle which may be assumed to be 100 nanoseconds. CPU clock or timing pulses are applied via a line 64 to the memory control matrix 52 and applied in parallel to two points of each of the stages of shift register 56. Each clock pulse may be assumed to be 10 nanoseconds long and to occur at the beginning of each CPU cycle.

Each register stage includes a two-input AND gate 66 whose output is connected to the input of a shift cell (SC) 68. The two inputs to each AND gate are the CPU clock pulses and the output from the shift cell of the previous stage. In the case of shift register stage number 1, the inputs to the AND gate 66 are the output of decoder 44 and the CPU clock pulses on line 64. The output of AND gate 66 is applied to the input of the shift cell 68. The output of shift cell 68 is applied to one input of the AND gate in the second stage and the other input is connected to the CPU clock via the line 64, etc. The memory-select section 52 of control matrix 50 as illustrated is designed for a memory read-write time requiring six CPU operating cycles and consequently each shift register contains six stages. The sixth CPU cycle is used for regenerating the data fetched from a memory. The output of each shift cell in the shift register 56 is connected through an OR gate 70 and fed back via a line 72 as one of the inputs to decoder 44 to prevent the selection of a memory which is already cycling, i.e., busy.

Since the memory access-time requires five CPU cycles, the output from the shift cell 68 in the fifth stage of register 56 is fed via a line 74 to one input of a two-input AND gate 76. The other input of AND gate 76 is connected to the output register of the selected memory unit No. 1 indicated by block 12. Consequently, upon the occurrence of an output pulse from the fifth stage of register 56 at CPU cycle-5, the selected data word in memory No. 1 is gated through AND gate 76 onto a common memory bus 78 until the beginning of CPU cycle-6. As shown in the drawing, each of the other three memory units 14, 16, and 18 also has an AND gate corresponding to AND gate 76 which may be conditioned by the output from the fifth stage of its corresponding shift register 58, 60, or 62, respectively, to gate data to bus 78 if its associated memory unit should be selected by the output of decoder 44.

The destination of the data, once it is gated onto the common data bus 78, is controlled by the register-assignment section 54 of memory control matrix 50 shown in FIGURE 3. Data bus 78 is connected to the instruction unit via an AND gate 80, to the execution or E-registers 32, 34, and 36 via the AND gates 82, 84, and 86, respectively, and to the I/O register 38 via an AND gate 88. The control matrix register-assignment section 54 functions to gate at ACCESS time, i.e., the beginning of CPU cycle-6, any data appearing on bus 78 through the selected one of these AND gates associated with the register which is assigned to receive the data.

Each of the shift registers in the register-assignment section 54 of control matrix 50 contains only five stages rather than the six stages of the registers in matrix section 52 since ACCESS time occurs one CPU cycle before the end of the entire read-write cycle of a memory unit. For the system shown in FIGURE 1, matrix assignment section 54 contains six shift registers corresponding to the particular receiving registers for which data may be fetched from the four memory units in bank 10. The outputs of REGISTER ASSIGNMENT CONTROL 42 have been labeled corresponding to the five possible register assignments plus a conditional instruction fetch which is a feature of the processing system shown in FIGURE 1. The I CONDITIONAL FETCH output is fed to the first stage of shift register 90, the I FETCH output to shift register 92, the $E_B$ FETCH to shift register 94, and the $E_C$ FETCH output to shift register 96, the $E_D$ FETCH output to shift register 98, and the I/O FETCH output to shift register 100. Each stage contains an AND gate and a shift cell (SC), and the shift register operation is generally the same as the shift registers in FIGURE 2 even though additional logical elements have been added to implement a change in register assignment when ordered by the CPU. The shift registers are stepped in synchronism with the CPU by the CPU clock pulses applied to two points of each stage in parallel via line 64. Shift registers 90 and 92 are controlled through suitable logic circuits by BRANCH OP CONTROL 46 for the purpose of keeping track of whether an instruction is conditionally held in I-Unit 20. These registers may also be reset to block transfer of an instruction to the I-Unit if the CPU determines that instruction is undesired, for example, because a branch or transfer operation is to occur.

If an I CONDITIONAL FETCH signal occurs on line 102 of CONTROL 42, then a bit is placed in the first stage of shift register 90 at memory SELECT time. This bit progresses from the first to the fifth stages during the memory cycle and on the fifth CPU cycle, if shift register 90 has not been reset by the CPU, the output from the fifth stage gates the word from bus 78 into instruction register $I_A$, represented by block 22, of the instruction unit 20.

If the CPU determines that the conditional instruction word is correct, then a SHIFT I CONDITIONAL TO I FETCH signal from CONTROL 46 causes the progressing bit in shift register 90 to be transferred to the next corresponding stage in shift register 92. This change may occur any time during the memory cycle and does not require that the CPU wait for the present memory cycle to expire and initiate another memory cycle. In like manner, if an I FETCH signal appears directly on the output 104 of CONTROL 44, then a bit is placed in the first stage of register 92 at memory SELECT time so that the fifth stage of register 92 gates the word from bus 78 into I-Unit 20 at ACCESS time. Either register 90 or 92 may be reset during a memory cycle if the CPU determines the instruction need not be executed. Reset of register 90 occurs when a signal RESET I COND appears on line 106, and reset of both register 90 and register 92 occurs when a RESET I FETCH signal appears on line 108.

Line 106 is connected through an OR gate 110 to an inverter 112 whose output is connected to one input of each four-input AND gate 113 between the shift cell stages of shift register 90. Because of the well known inverter function, the output of inverter 112 is up or energized when there is no output from CONTROL 46 on line 106. Line 108 is also connected through OR gate 110 to inverter 112. However, if CONTROL 46 places a signal on either line 106 or 108, the output of inverter 112 goes down or is de-energized so that each AND gate 113 of shift register 90 is inhibited thereby disabling or resetting the shift register. A RESET I FETCH signal on line 108 also has the effect of resetting shift register 92 since line 108 is also connected to an inverter 114 whose output is connected to one of the inputs of each three-input AND gate 116 connected between the stages of shift register 92.

If the guessed or conditional memory address of an instruction word is correct, control of bus 78 is changed from shift register 90 to shift register 92. This change is accomplished by means of AND gates 118, 120, 122, and 124 connected between the outputs of stages 1, 2, 3, and 4 of shift register 90 and the inputs of stages 2, 3, 4, and 5 of shift register 92. Each AND gate has three inputs. If the conditional instruction address is correct, a SHIFT I CONDITIONAL TO I FETCH signal appears on the output line 128 of BRANCH OP CONTROL 46. This signal is applied to one input of each of the AND gates 118–124. This signal is also applied to an inverter 130 whose output is connected to the input of each of the AND gates 113 between the stages of shift register 90. Consequently, when line 128 is down, inverter 130 is up and there is to be no shift of control between shift registers 90 and 92, because AND gates 118–124 are inhibited to reset shift register 92, and the AND gates 113 are conditioned to permit normal cycling of shift register 90. However, when a shift is to occur, the CPU energizes line 128 thereby conditioning AND gates 118–124 and inhibiting AND gates 113 to reset register 90. The second input of each of AND gates 118–124 is connected to line 64 carrying CPU clock pulses. The third input is connected to the output of the previously numbered stage of shift register 90. For example, the output of the shift cell in stage-1 of shift register 90 is connected via a conductor 132 to an input of AND gate 118. Consequently, if a SHIFT I CONDITIONAL TO I FETCH signal should appear during CPU cycle-1, then the bit in shift register 90 is transferred from stage-1 shift cell (SC) 134 to register 92 via AND gate 118 to shift cell (SC) 136 of stage-2 of shift register 92. In like manner, bits in stages 2, 3, and 4 of shift register 90 may be transferred to the next higher numbered stage in shift register 92 if one of the corresponding three-input AND gates 120–124 is conditioned by the occurrence of a SHIFT I CONDITIONAL TO I FETCH signal on line 120 on the output CONTROL 46.

Stage-5 of both shift registers 90 and 92 are connected through AND gates to the input of AND gate 80 to gate the instruction word on bus 78 into I-Unit 20 at the beginning of CPU cycle-6. However, these AND gates also permit resetting of both registers 90 and 92 at this time and also permit a shift of the control of bus 78 from register 90 to register 92.

More specifically, an AND gate 138 is connected to the output of stage-5 of shift register 90 and also to the inverters 112 and 130. Consequently, if CPU 40 issues either a RESET I COND, RESET I FETCH, or SHIFT I COND TO I FETCH command, AND gate 138 is inhibited so that it cannot condition AND gate 80 at the beginning of CPU cycle-6. An AND gate 140 also is connected to the shift cell (SC) of stage-5 of shift register 90 and to line 128, so that upon the occurrence of SHIFT I COND TO I FETCH command, AND gate 80 is conditioned by the output of AND gate 140 to gate bus 78 to I-Unit 20 at the beginning of CPU cycle-6. Furthermore, an AND gate 142 is connected to inverter 114 and to stage-5 of shift register 92 and normally functions to condition AND gate 80 at the begining of CPU cycle-6; however, upon the occurrence of a RESET I FETCH command, AND gate 142 is inhibited and cannot condition AND gate 80 at the beginning of CPU cycle-6.

Let us now look at shift registers 94, 96, and 98 and the manner in which they track the E-register assignments and permit a change in register assignment during a memory cycle.

Shift register 94 keeps track of the assignment of E-register $E_B$ and gates data from bus 78 via AND gate 82 to register $E_B$ at CPU cycle-6 if that register is assigned to receive the data at that time. In like manner, shift register 96 controls the gating of data from bus 78 via AND gate 84 to register $E_C$, and shift register 98 controls the gating of data from bus 78 via AND gate 86 to register $E_D$.

Each shift register contains five stages, and each stage contains an AND gate and a shift cell (SC) which function like the stages of shift registers 90 and 92, already described. Looking at shift register 94, for example, at CPU cycle-1, a bit is gated into the shift cell of the first stage by the coincidence of a CPU clock pulse and an $E_B$ FETCH signal at the inputs of AND gate $144_B$. The AND gates $146_B$ of stages 2–5 have three inputs. Two of the inputs are from the CPU clock and the previous stage output. The third input is connected to an inverter $148_B$ which is connected to line 150 from CONTROL 48. The shift cell (SC) of each of stages 1 through 4 of shift register 94 is connected via a three-input AND gate to the next higher numbered stage of shift register 96. Stages 1–4 of register 94 are connected via respective AND gates 154, 156, 158, and 160 to stages 2–5, respectively, of shift register 96.

In operation, if the assignment of register $E_B$ to the data-fetch remains unchanged during a memory cycle, then shift register 94 steps with the CPU clock until at the beginning of CPU–6 a bit is gated through AND gate $152_A$ to condition AND gate 82 and gate data bus 78 to register $E_B$. In this case there is no SHIFT $E_B$ ASSIGNMENT TO $E_C$ signal on line 150, and inverter $148_B$ conditions all the AND gates $146_B$. However, it is desirable to keep the I-Unit registers $I_A$, $I_B$, $I_C$, and $I_D$ as full as possible, and an instruction entering register $I_A$ moves down toward register $I_D$ as the lower registers become available. As the instruction shifts through the I-registers, the CPU CONTROL 48 issues commands to shift the E-register assignment to correspond to the I-register holding the instruction at memory ACCESS time.

For example, if line 150 is energized by CONTROL 48 during CPU-2 time, inverter $148_B$ inhibits all the AND gates $146_B$ plus the AND gate $152_B$ to reset shift register 94. However, line 150 is also connected to an input of each of the shifting AND gates 154–160 and also to AND gate 162. Consequently, at the CPU-2 time, the bit stored in the first stage of shift register 94 is transferred via AND gate 154 to the second stage of shift register 96. The bit is stepped until it is gated through AND gate $152_C$ to connected register $E_C$ to the data bus 78 at the beginning of CPU-6 time. The SHIFT signal may occur during CPU-5 time, in which case AND gate 162 functions to shift the bit to shift register 96 to gate the data bus 78 to register $E_C$ rather than to register $E_B$.

Of course, the instruction may also shift to register $I_D$ during the memory fetch cycle. CONTROL 48 will then issue another SHIFT signal on line 163 to shift control of the bus 78 to shift register 98 so that the bus is gated to register $E_D$. AND gates 164, 166, 168, 170, and 172 perform the bit-shifting function for an $E_C$-to-$E_D$ transfer in the same manner as AND gates 154–162, respectively, do for an $E_B$-to-$E_C$ transfer.

Shift register 100 tracks the commitment of I/O register 38 and gates data from bus 78 via AND gate 88 to register 38 when the CPU control issues an I/O FETCH command.

There has been described a memory control matrix which can easily terminate an I-fetch any time prior to ACCESS time if the CPU determines the instruction is undesired. The average memory access time per word is reduced by not waiting for undesired words. Furthermore, data fetches can be reassigned during a memory fetch cycle to another register which becomes available after memory SELECT time.

While the invention has been particularly shown and described with reference to a preferred embodiment thereof, it will be understood by those skilled in the art that various changes in form and details may be made therein without departing from the spirit and scope of the invention.

What is claimed is:

1. For use in a data processing system including memory means storing data at different addresses therein, a plurality of addressable data utilization means, and a central processing unit for controlling the transfer of addressed data between the memory means and a first addressed utilization means, the memory having a data access-time longer than the time of each operating cycle of the central processing unit; a control device synchronized with the central processing unit for addressing a second data utilization means during said memory access-time so that the data from the memory is transferred at the end of said memory access-time to said second utilization means instead of to said first data utilization means.

2. In a data processing system including a plurality of addressable data-storing memories, a plurality of addressable data receivers, a data bus interconnecting said memories and said receivers, a central processing unit controlling the transfer of data from a selected memory via said but to a selected data receiver, each memory data-fetch cycle comprising a plurality of central processing unit operating cycles, said memory cycle being initiated by the selection of a particular memory and the addressing of particular data therein and terminated at the time that the addressed data is available to the data bus, the improvement comprising (a) first memory cycle tracking means synchronized with the central memory unit and actuated at the beginning of a memory cycle to couple the data bus to a first addressed data receiver at the end of said memory cycle, (b) a second memory cycle tracking means synchronized with said central processing unit for coupling said bus to a second data receiver, (c) and means interconnecting said first and second tracking means to transfer, during said memory cycle, control of said data bus from said first tracking means to said second tracking means so that at the end of said memory cycle said data bus is coupled to said second data receiver rather than to said first data receiver.

3. In a data processing system including a plurality of addressable data-storing memories, a plurality of addressable data receivers, a data bus interconnecting said memories and said receivers, a central processing unit controlling the transfer of data from a selected memory via said bus to a selected data receiver, each memory data-fetch cycle comprising a plurality of central processing unit operating cycles, said memory cycle being initiated by the selection of a particular memory and the addressing of a particular data therein and terminated at the time that the addressed data is available to the data bus, the improvement comprising (a) a memory cycle tracking means associated with each data receiver and synchronized with the data processing system for coupling the data bus to the selected data receiver, (b) means actuating at the beginning of a memory cycle the memory tracking means associated with said selected data receiver to couple said bus to said selected data receiver at the end of said memory cycle, and (c) means responsive to the central processing unit for disabling said tracking means during said memory cycle so that said bus is not coupled to said selected data receiver at the end of said memory cycle.

4. The invention defined in claim 3 further comprising means for transferring, during a memory cycle, the memory tracking function to a different memory tracking means associated with a different data receiver so that said bus is coupled to said different data receiver at the end of said memory cycle.

5. In a data processing system including a plurality of addressable data-storing memories, a plurality of addressable data receivers, a data bus interconnecting said memories and said receivers, a central processing unit controlling the transfer of data from a selected memory via said bus to a selected data receiver, each memory data-fetch cycle comprising a plurality of central processing unit operating cycles, said memory cycle being initiated by the selection of a particular memory and the addressing of particular data therein and terminated at the time that the addressed data is available to the data bus, the improvement comprising (a) a shift register associated with each memory, (b) a shift register associated with each data receiver, (c) means under the control of the central processing unit for placing at memory-select time a bit in a selected memory shift register and in a selected receiver shift register, (d) means controlled by said central processing unit for stepping said bits along said selected shift registers until memory access-time, (e) means responsive to the coincidence of both bits being in a position in their respective shift registers corresponding to memory access-time to gate the addressed data in said selected memory via said data bus to said selected receiver, (f) means to transfer, during the memory cycle, the bit from said selected receiver shift register to a second receiver shift register, and (g) means responsive to the coincidence of both bits being in a position in said memory shift register and in said second receiver shift register corresponding to memory access-time for transferring the addressed data via said bus to said second receiver.

6. The invention defined in claim 5 further comprising means responsive to said central processing unit to disable each receiver-associated shift register during said memory cycle.

References Cited

UNITED STATES PATENTS

| | | | |
|---|---|---|---|
| 3,015,441 | 1/1962 | Rent et al. | 235—157 |
| 3,201,762 | 8/1965 | Schrimpf | 340—172.5 |

PAUL J. HENON, *Acting Primary Examiner.*

R. ZACHE, *Assistant Examiner.*